(No Model.)
T. KUNDTZ.
WHEEL RIM.
No. 563,774.  Patented July 14, 1896.
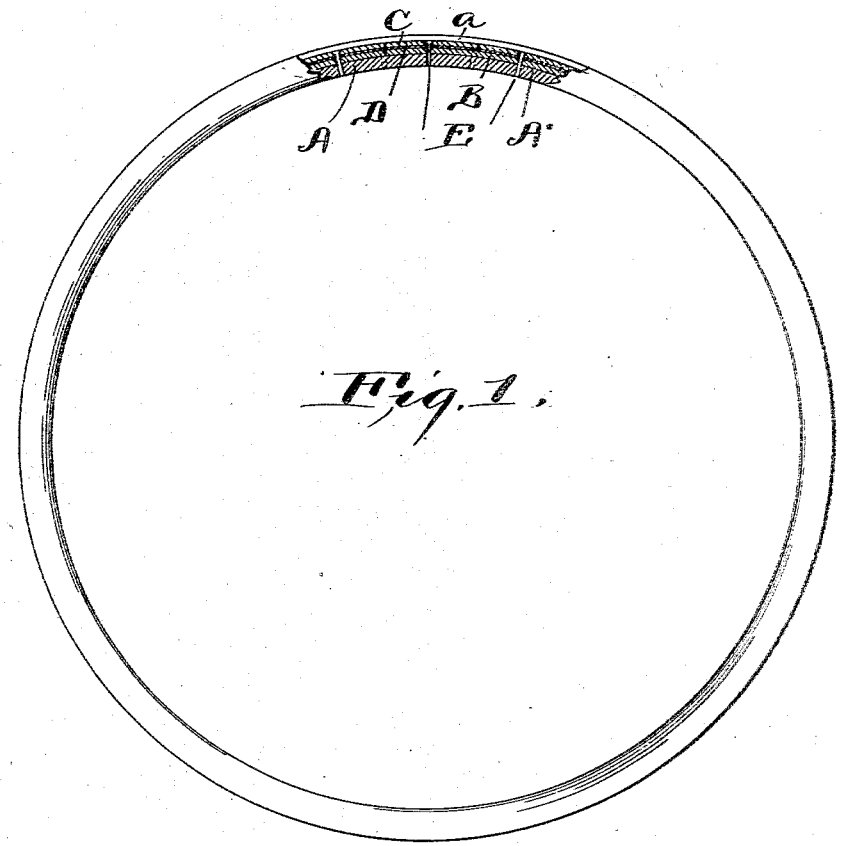
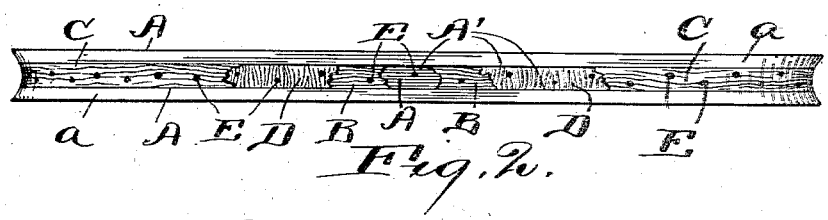
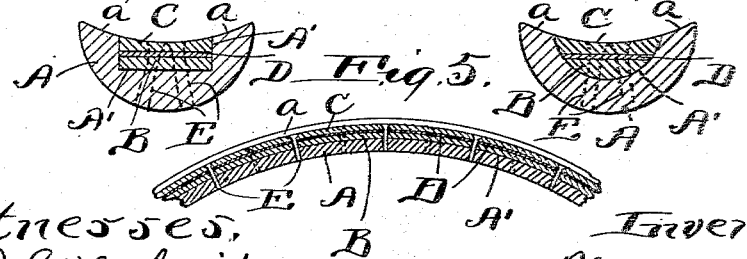
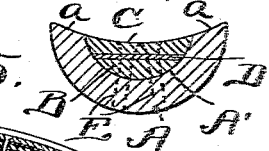
Witnesses,  Inventor,
E. B. Gilchrist  Theodor Kundtz
  M. D. Leggett & Co
  his Attorneys.

UNITED STATES PATENT OFFICE.

THEODOR KUNDTZ, OF CLEVELAND, OHIO.

WHEEL-RIM.

SPECIFICATION forming part of Letters Patent No. 563,774, dated July 14, 1896.

Application filed September 9, 1895. Serial No. 561,882. (No model.)

*To all whom it may concern:*

Be it known that I, THEODOR KUNDTZ, of Cleveland, in the county of Cuyahoga and State of Ohio, have invented certain new and useful Improvements in Wheel-Rims; and I do hereby declare the following to be a full, clear, and exact description of the invention, such as will enable others skilled in the art to which it pertains to make and use the same.

My invention relates to improvements in wheel-rims, and more especially to wheel-rims that are used in the construction of bicycle-wheels, the object being to construct a wheel-rim that is not liable to warp or bend out of shape, and that will not, in use, split at the spoke-engaging holes; that possesses great resiliency, strength, and durability, and has not the joints between the layers of which it is composed exposed to the weather.

With this object in view my invention consists in certain features of construction and combinations of parts hereinafter described, and pointed out in the claims.

In the accompanying drawings, Figure 1 is a side elevation, partly in section, of a wheel-rim embodying my invention. Fig. 2 is a top plan relative to Fig. 1, and portions are broken away in this figure to more clearly show the construction. Fig. 3 is a transverse section of the wheel-rim, but the rim is shown on a larger scale in Fig. 3 than in Figs. 1 and 2. Fig. 4 is a transverse section of a wheel-rim embodying my invention and shows a construction substantially the same but slightly different from the construction shown in Fig. 3. Fig. 5 shows a longitudinal section of a portion of a wheel-rim that has the comparatively thin wooden layer D composed of several pieces arranged at suitable intervals.

My improved wheel-rim is preferably concavo-convex in cross-section, as shown is Figs. 3 and 4. The inner periphery of the rim is convex in cross-section, and the outer periphery, that forms the seat for the tire of the wheel, is concave in cross-section. The inner convex peripheral surface of the wheel-rim is formed upon a circular bar or strip A, and the outer portions *a* of the outer peripheral surface of the rim are also preferably formed upon said strip or bar A. Bar or strip A, at its outer periphery and central portion, is grooved or recessed circumferentially, as at A'. The recess of groove A', in the outer face of strip or bar A, is deep enough to receive three layers of wood. The inner layer B is suitably fitted and glued or cemented within the inner portion of the aforesaid groove or recess. The outer layer C fits and is suitably glued or cemented within the outer portion of recess or groove A', and is preferably concave upon its outer face, and has its said concave surface flush with the outer concave surfaces of bar or strip A, as shown in Figs. 3 and 4. Bar or strip A and the inner and outer layers of wood within the recess or groove in said strip or bar A have their grain running lengthwise thereof, that is, circumferentially of the wheel-rim. The centrally-located layer D occupies the central portion of groove or recess A', and is suitably glued or cemented to the opposing surfaces of the inner and outer layers B and C. The central layer D has its grain running transversely thereof and consequently crosswise of the wheel-rim. The central layer D is comparatively thin and may be composed of veneer. The inner and outer layers B and C are preferably composed, respectively, of a single strip or bar, and the central layer is preferably composed of several pieces, and the latter may be arranged at intervals, as shown in Fig. 5, if desired.

E designates the holes made in the wheel-rim for the reception of the spokes of the bicycle-wheel in the construction whereof the rim is used. Holes E extend through strip or bar A and through the different layers of wood seated in the groove or recess A' of said bar.

I would here remark that a wheel-rim constructed according to my invention will not warp and cannot possibly split at the spoke-receiving holes E from the great strain to which it is liable to be subjected, and it will also be observed that my improved rim has not the joints between the different layers of which it is composed exposed to the weather, and, briefly described, the hereinbefore-described rim has a triplicate reinforcement consisting of three layers contained within the groove formed in the inner or body portion of the rim, and having the grain of its central reinforcing-layer crosswise of the remaining layers, and the grooved bar or body portion of the rim covers all the joints of the reinforcement.

What I claim is—

1. A wheel-rim consisting of a wooden ring having an annular groove cut in its periphery, and a wooden reinforcing-ring fitting and occupying and suitably secured within said groove.

2. A wheel-rim having its thickness composed of different wooden layers whose grain runs lengthwise thereof, and a wooden layer located at any suitable point between the inner periphery and outer periphery of the rim, and composed of any suitable number of comparatively thin wooden strips or pieces that have the grain thereof running crosswise of the wheel-rim, substantially as shown, for the purpose specified.

3. A wheel-rim having its body portion formed of a wooden bar or strip that forms the inner portion of the rim and that is recessed or grooved centrally and circumferentially at its outer face, reinforcing wooden layers suitably secured within the groove or recess of the body portion and extending circumferentially of the body portion and glued or cemented within said recess or groove, and one of said internal wooden layers arranged within said recess or groove and composed of any suitable number of thin wooden strips or pieces that have their grain running crosswise of the rim, substantially as shown, for the purpose specified.

4. A wheel-rim consisting of a wooden bar or strip that forms the inner portion of the wheel-rim, which strip or bar is recessed or grooved centrally and circumferentially at its outer face; two wooden layers that have their grain running longitudinally, fitted and glued or cemented within said groove or recess, and any suitable number of thin wooden strips or pieces interposed between and suitably glued or cemented to said wooden layers and having their grain running crosswise of the rim, substantially as shown, for the purpose specified.

5. A wheel-rim comprising a circular wooden strip or bar provided, at the central portion of its outer periphery, with a groove or recess extending circumferentially of the rim, and three wooden layers suitably secured within said recess or groove, and the central layer consisting of any suitable number of thin strips or pieces suitably glued or cemented between the outer layer and inner layer, and having its grain running crosswise of the rim, and the inner layer and outer layer having their grain running longitudinally thereof, substantially as shown, for the purpose specified.

6. A wheel-rim comprising the circular wooden bar or strip A concavo-convex in cross-section and having the convex surface forming the inner periphery of the rim, said bar or strip, at the central portion of its outer periphery, being provided with an annular groove or recess A', the three wooden layers, B, C and D suitably fitted and secured within said recess or groove, the outer layer having its outer surface concave and flush with the concave surfaces of the aforesaid strip or bar, and the central layer being composed of any suitable number of comparatively thin wooden strips or pieces that have their grain running crosswise of the wheel-rim, and the inner layer and outer layer having their grain running longitudinally thereof, substantially as shown, for the purpose specified.

In testimony whereof I sign this specification, in the presence of two witnesses, this 3d day of September, 1895.

THEODOR KUNDTZ.

Witnesses:
CHAS. H. DORER,
ELLA E. TILDEN.